(12) United States Patent
Park

(10) Patent No.: US 12,583,417 B2
(45) Date of Patent: Mar. 24, 2026

(54) SMART KEY SYSTEM FOR VEHICLE AND METHOD OF CONTROLLING THE SAME

(71) Applicant: HYUNDAI MOBIS CO., LTD., Seoul (KR)

(72) Inventor: Yong Hee Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 32 days.

(21) Appl. No.: 18/600,526

(22) Filed: Mar. 8, 2024

(65) Prior Publication Data

US 2024/0326741 A1 Oct. 3, 2024

(30) Foreign Application Priority Data

Mar. 27, 2023 (KR) ........................ 10-2023-0039602

(51) Int. Cl.
*B60R 25/24* (2013.01)
*B60R 25/01* (2013.01)
*B60R 25/10* (2013.01)
*G07C 9/00* (2020.01)

(52) U.S. Cl.
CPC .............. *B60R 25/24* (2013.01); *B60R 25/01* (2013.01); *B60R 25/10* (2013.01); *G07C 9/00309* (2013.01); *B60R 2025/1013* (2013.01); *G07C 2009/00793* (2013.01); *G07C 2009/00984* (2013.01); *G07C 2209/63* (2013.01)

(58) Field of Classification Search
None
See application file for complete search history.

(56) References Cited

U.S. PATENT DOCUMENTS

| | | | | |
|---|---|---|---|---|
| 9,306,743 | B2 * | 4/2016 | Ho ........................... | B60R 25/24 |
| 11,458,928 | B2 * | 10/2022 | Umegaki ................ | E05B 49/00 |
| 2011/0140884 | A1 * | 6/2011 | Santiago ............... | G01S 5/0027 |
| | | | | 340/539.13 |
| 2021/0189985 | A1 * | 6/2021 | Fukuchi ................ | F02D 41/222 |
| 2023/0182685 | A1 * | 6/2023 | Siswick ................ | B60R 25/245 |
| | | | | 340/5.61 |

FOREIGN PATENT DOCUMENTS

KR 10-2022-0126138 A 9/2022

* cited by examiner

*Primary Examiner* — Carlos Garcia
(74) *Attorney, Agent, or Firm* — Morgan, Lewis & Bockius LLP

(57) ABSTRACT

A smart key system for a vehicle includes a communication unit configured to communicate with a smart key, memory configured to store a code and a count that are included in a signal received from the smart key, and a processor configured to identify whether the smart key has been registered with the vehicle based on the signal, determine whether the count is normal by comparing the count with a pre-stored count, control a door of the vehicle in response to the code when the count is normal, and control the door to maintain a lock state when the count is not normal. The present disclosure has effects in that a signal of the smart key and a hacked signal can be easily distinguished and the security of a vehicle can be improved by using a count that is generated based on the vibration of the smart key.

8 Claims, 6 Drawing Sheets

SMART KEY SYSTEM FOR VEHICLE AND METHOD OF CONTROLLING THE SAME

CROSS-REFERENCE TO RELATED APPLICATION

This application claims priority from and the benefit of Korean Patent Application No. 10-2023-0039602, filed on Mar. 27, 2023, which is hereby incorporated by reference for all purposes as if set forth herein.

BACKGROUND

Field

Exemplary embodiments of the present disclosure relate to a smart key system for a vehicle and a method of controlling the same, and more particularly, to a smart key system for a vehicle and a method of controlling the same, which solve a hacking problem for a signal of a smart key by using a count that is generated based on a vibration signal of the smart key.

Discussion of the Background

With the introduction of a smart key, a door of a vehicle is unlocked through the pressing of a key for the smart key, or the state of the vehicle is changed into a lock state.

Furthermore, the vehicle is constructed to have its door unlocked as a driver who owns the smart key approaches the vehicle and to have its door locked when the smart key becomes distant from the vehicle by a predetermined distance or more.

In a vehicle to such a smart key system has been applied, when a smart key function is performed, a driver who owns a valid smart key can approach the vehicle without a separate manual manipulation, can unlock a door or trunk of the vehicle, and can start the vehicle through only a simple touch even without manually starting the vehicle upon driving.

However, in using such a smart key, there is a problem in that it is difficult to handle the interception of a signal of the smart key using a hacking device at an adjacent location when a door of a vehicle is unlocked.

The hacking device may intercept the signal of the smart key, and may transmit a jamming signal so that the signal of the smart key does not arrive at the vehicle. When a user manipulates a button of the smart key again and transmits the signal again, the hacking device transmits the previously intercepted signal to the vehicle so that a door of the vehicle is unlocked.

The signal of the smart key, which has been hacked in such a manner, may be used to unlock a door of the vehicle after the user moves from the vehicle. The hacking device transmits the previously intercepted signal to the vehicle. The vehicle unlocks the door by recognizing the received signal as a signal of the smart key. Accordingly, a problem in that an article within the vehicle is robbed or even the vehicle is robbed may occur.

Accordingly, it is necessary to prepare countermeasures against a problem in that a signal is hacked while maintaining user convenience.

A related technology includes Korean Patent Application Publication No. 10-2022-0126138 entitled "SMART KEY SYSTEM FOR DETECTING VIBRATION".

SUMMARY

Various embodiments are directed to a smart key system for a vehicle and a method of controlling the same, which prevent a robbery which occurs by illegally hacking a signal of a smart key and unlocking a door of a vehicle.

In an embodiment, a smart key system for a vehicle includes a communication unit configured to communicate with a smart key, memory configured to store a code and a count that are included in a signal received from the smart key, and a processor configured to identify whether the smart key has been registered with the vehicle based on the signal, determine whether the count is normal by comparing the count with a pre-stored count, control a door of the vehicle in response to the code when the count is normal, and control the door to maintain a lock state when the count is not normal.

The processor compares the pre-stored count and the count, and determines that the count is normal when the count is greater than the pre-stored count by a predetermined value or more.

The processor determines that the count is not normal when the count is equal to or less than the pre-stored count.

The processor identifies a location of the smart key based on the signal of the smart key, does not compare the count and the pre-stored count by treating, as an exception, a case in which the location of the smart key is within a predetermined distance from the vehicle, and controls the door based on the count.

When the smart key becomes distant from the vehicle by a first distance or more, the processor changes a state of the door into the lock state and stores a count included in a signal that has been finally received through the communication unit.

The smart key system further includes an output unit configured to output a warning in the form of at least one of a warning message, a warning lamp, a warning sound, and voice guidance when the count is not normal.

In an embodiment, a smart key system for a vehicle includes a communication module configured to communicate with the vehicle, at least one button configured to control a door of the vehicle, a vibration sensor configured to detect vibration attributable to a movement or displacement of a main body, and a smart key processor configured to control a count to be cumulatively stored in response to a signal received from the vibration sensor, to control a signal including a code corresponding to the button that is pressed and the count to be generated, and to control the signal to be transmitted to the vehicle.

The smart key processor cumulatively stores, as the count, the number of interrupts applied by the vibration sensor.

The vibration sensor generates the interrupt and applies the interrupt to the smart key processor, when the size of a vibration signal according to the detected vibration is greater than a maximum reference value or equal to or smaller than a minimum reference value.

In an embodiment, a method of controlling, by a vehicle, a smart key system includes receiving, by a communication unit, a signal from a smart key, identifying, by a processor, whether the smart key has been registered with the vehicle and identifying a code and a count included in the signal, determining, by the processor, whether the count is normal by comparing the count with a pre-stored count, controlling, by the processor, a door of the vehicle in response to the code when the count is normal, and controlling, by the processor, the door to maintain a lock state when the count is not normal.

In the determining of whether the count is normal, the processor compares the pre-stored count and the count, determines that the count is normal when the count is greater than the pre-stored count by a predetermined value or more, and determines that the count is not normal when the count is equal to or less than the pre-stored count.

In the determining of whether the count is normal, the processor controls the door in response to the code by treating, as an exception, a case in which the smart key is disposed within a predetermined distance from the vehicle.

The method further includes changing a state of the door into the lock state when the smart key becomes distant from the vehicle by a first distance or more, and storing a count included in a signal that is finally received through the communication unit.

The method further includes outputting, by the output unit, a warning in the form of at least one of a warning message, a warning lamp, a warning sound, and voice guidance when the count is not normal.

The count is the number of interrupts occurred cumulatively, which are generated by a vibration sensor included in the smart key.

According to an aspect, the smart key system for a vehicle and the method of controlling the same according to embodiments of the present disclosure have effects in that a vehicle can easily distinguish between a signal of the smart key and a hacked signal based on a count by setting the count based on the vibration of the smart key and transmitting a signal of the smart key, which includes the count, and that the security of a vehicle can be improved by maintaining the state of a door of the vehicle to a lock state in response to a hacked signal.

According to an aspect of the present disclosure, the smart key system for a vehicle and the method of controlling the same has an effect in that the robbery of a vehicle or an article within the vehicle can be prevented by preventing the unlocking of a door of the vehicle through hacking.

DETAILED DESCRIPTION OF THE ILLUSTRATED EMBODIMENTS

Figure 1:
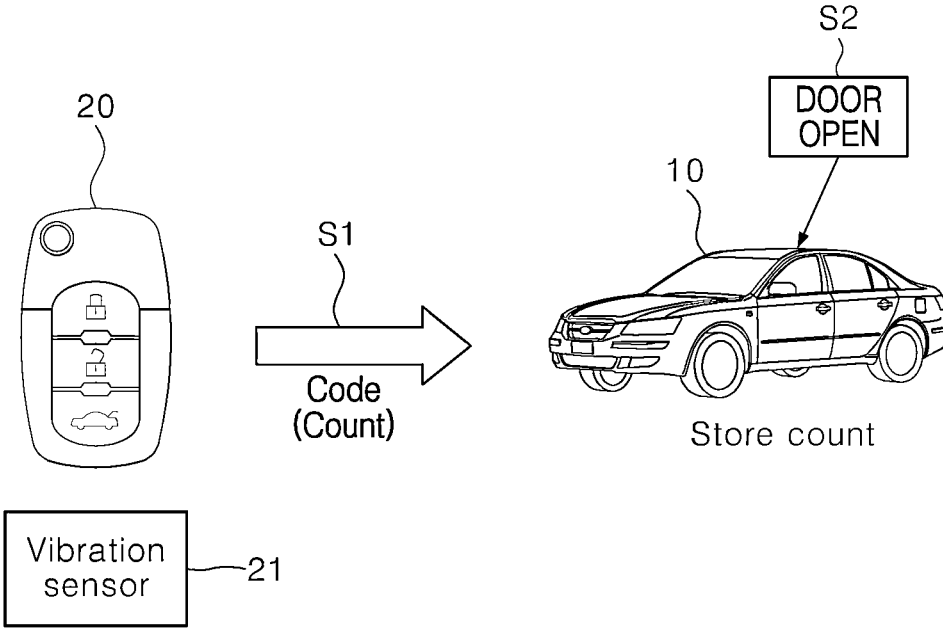
FIG. 1 is a diagram illustrating a construction of a smart key system for a vehicle according to an embodiment of the present disclosure.

Hereinafter, a smart key system for a vehicle and a method of controlling the same according to embodiments of the present disclosure will be described with reference to the accompanying drawings.

In this process, the thicknesses of lines or the sizes of components illustrated in the drawings may have been exaggerated for the clarity of a description and for convenience' sake. Furthermore, terms to be described below have been defined by taking into consideration their functions in the present disclosure, and may be changed depending on a user or operator's intention or practice. Accordingly, such terms should be defined based on the overall contents of this specification.

FIG. 1 is a diagram illustrating a construction of a smart key system for a vehicle according to an embodiment of the present disclosure.

As illustrated in FIG. 1, the smart key system according to an embodiment of the present disclosure includes a vehicle 10 and a smart key 20.

The smart key 20 converts a code relating to the lock, unlocking, trunk opening, or startup of the vehicle into a designated signal S1 in response to a manipulation of a plurality of buttons 24 that are included in the smart key 20, and transmits the signal S1 to the vehicle 10.

The smart key 20 generates an interrupt count in response to the vibration of the smart key, which is detected through a vibration sensor 21 included in the smart key, generates the signal S1 by converting a corresponding count along with the code, and transmits the generated signal S1 to the vehicle 10.

The smart key 20 may transmit at least one of a lock signal, an unlocking signal, a startup signal, a start-off signal, and a door opening signal to the vehicle 10. Furthermore, the smart key 20 may transmit a separate wake-up signal. Furthermore, when approaching the vehicle 10 within a predetermined distance, the smart key 20 may unlock a door of the vehicle 10 through communication with the vehicle 10.

The vehicle 10 identifies the code by analyzing the received signal S1, and locks or unlocks the door based on the code (S2). The vehicle 10 stores the count that is received along with the code.

The vehicle 10 stores the count that is received from the smart key 20, and determines whether a new count is normal by comparing the new count and the pre-stored count when receiving the new signal. Accordingly, the vehicle 10 can determine whether a received signal of the smart key is a signal that has been received normally or a signal that has been intercepted by hacking.

When determining that the new count is not normal, the vehicle 10 may determine that the received signal as a signal by hacking, and may hold the state of the door in the lock state.

When a signal is normal based on a count, the vehicle 10 may lock or unlock the door based on a code.

Figure 2:
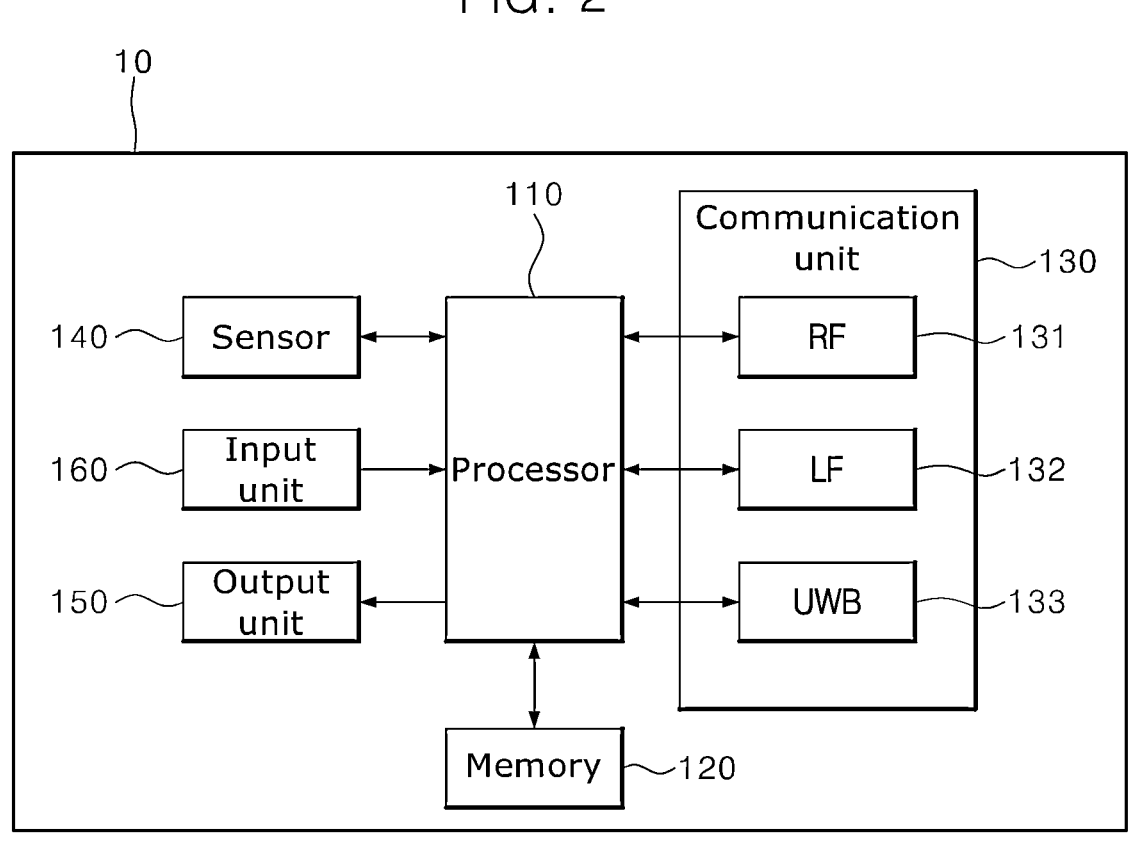
FIG. 2 is a diagram illustrating constructions of a vehicle using the smart key system and a smart key of the smart key system according to an embodiment of the present disclosure.
Figure 2:
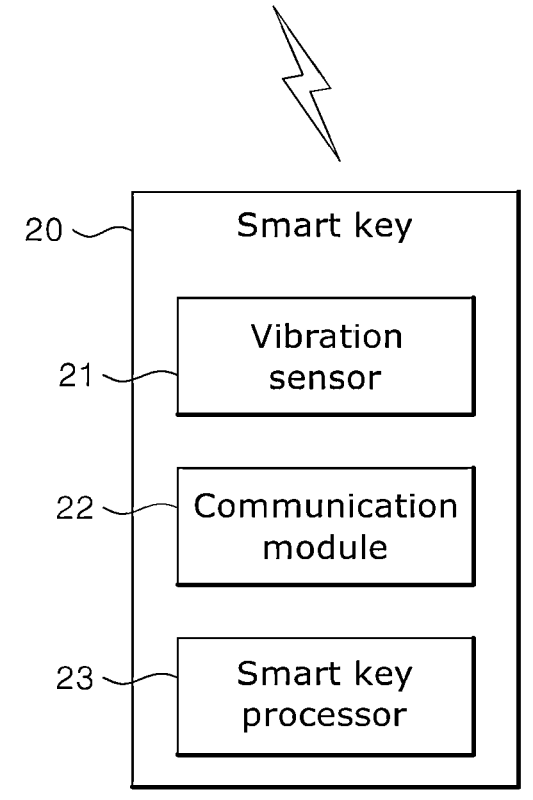

FIG. 2 is a diagram illustrating constructions of the vehicle using the smart key system and the smart key of the smart key system according to an embodiment of the present disclosure.

As illustrated in FIG. 2, the vehicle 10 includes a sensor 140, an input unit 160, an output unit 150, a communication unit 130, memory 120, and a processor 110. In addition, the vehicle 10 further includes an apparatus, etc. for controlling the driving of the vehicle, including an engine or a motor, but the description of components not related to major characteristics of the present disclosure is omitted hereinafter.

The smart key 20 includes a vibration sensor 21, a communication module 22, and a smart key processor 23. Furthermore, the smart key 20 includes the buttons 24.

The communication module 22 includes an RF module, an LF module, and a UWB module, and communicates with the vehicle 10.

According to an exemplary embodiment of the present disclosure, the communication module 22 is configured as a hardware (e.g., computer, microprocessor, CPU, ASIC, circuitry, logic circuits, etc.) and is coupled with an associated non-transitory memory storing software instructions which, when executed by the processor, provides the functionalities as described above. Herein, the memory and the processor may be implemented as separate semiconductor circuits. Alternatively, the memory and the processor may be implemented as a single integrated semiconductor circuit. The processor may embody one or more processor(s).

The vibration sensor 21 detects vibration attributable to a movement or displacement of the smart key 20 (that is a main body of the smart key 20).

The vibration sensor 21 generates an interrupt based on a vibration signal, and applies the vibration signal to the smart key processor 23.

The smart key processor 23 determines whether the smart key 20 has moved based on a vibration signal of the vibration sensor 21. The smart key processor 23 may control the transmission and reception of signals of the communication module 22 based on the vibration signal.

The smart key processor 23 stores the number of interrupts by counting the interrupts. The smart key processor 23 accumulates and stores the count based on the number of interrupts, and initializes the count when the count arrives at a maximum value.

The smart key processor 23 generates a signal that has a designated format and that includes a count corresponding to the pressing of the button 24 and a count at timing at which the pressing of the button 24 occurs, and transmits the signal to the vehicle 10.

The vehicle 10 controls the door of the vehicle based on a signal that is received from the smart key 20.

The sensor 140 includes a plurality of sensors, and applies detected data to the processor 110. For example, the sensor 140 includes a vehicle speed sensor, a temperature sensor, and a proximity sensor.

The proximity sensor detects an object that is disposed within a predetermined distance from the vehicle 10. When a user approaches the vehicle 10, the proximity sensor applies a detection signal to the processor 110.

The input unit 160 includes at least one input means, among a switch, a button, and a touch pad. The input unit 160 includes input means for turning on or off an audio system, an air conditioner system, a winker, and an emergence lamp or inputting the setting of the audio system, the air conditioner system, the winker, and the emergence lamp.

Furthermore, the input unit 160 may include input means for a brake pedal, an accelerator pedal, a clutch pedal, a gear rod, and a parking brake which are manipulated by a driver.

The output unit 150 includes at least one of an LED lamp, a display, and a speaker.

The output unit 150 outputs a current state or driving state of the vehicle 10. The output unit 150 outputs a sound of an audio system or voice guidance of a navigation system through the speaker, and also outputs at least one of an effect sound, a warning sound, and voice guidance through the speaker with respect to a vehicle state.

The output unit 150 outputs information on the speed, amount of remaining battery power, possible mileage, and vehicle state of the vehicle through the display. Furthermore, the output unit 150 may output an operating screen of the audio system or the navigation system through the display.

The output unit 150 outputs a brake lamp, a winker, a fog lamp, a reverse lamp, and a warning lamp, and may output an operating state of the vehicle within the vehicle through the lighting of the lamp.

The memory 120 stores data of the vehicle, and stores data for the certification of the smart key 20 and data that are received from the smart key 20. The memory 120 may divisively store a code for a signal of the smart key and a count.

Furthermore, the memory 120 may store a locking control algorithm, a smart key signal processing algorithm, and a signal transmission and reception algorithm.

The memory 120 includes storage means such as non-volatile memory and flash memory, such as random access memory (RAM), read-only memory (ROM), and electrically erased programmable ROM (EEPROM).

The communication unit 130 includes a driver for controller area network (CAN) communication or a driver for local interconnect network (LIN) communication, and transmits and receives data.

The communication unit 130 includes an RF module 131, an LF module 132, and a UWB module 133, and transmits and receives signals of the smart key 20 and communicates with another adjacent device.

According to an exemplary embodiment of the present disclosure, the communication unit 130 is configured as a hardware (e.g., computer, microprocessor, CPU, ASIC, circuitry, logic circuits, etc.) and is coupled with an associated non-transitory memory storing software instructions which, when executed by the processor, provides the functionalities as described above. Herein, the memory and the processor may be implemented as separate semiconductor circuits. Alternatively, the memory and the processor may be implemented as a single integrated semiconductor circuit. The processor may embody one or more processor(s).

The LF module 132 is used to transmit a signal from the vehicle 10 to the smart key 20. The RF module 131 processes a signal that is received from the smart key 20. The RF module 131 and the LF module 132 may be controlled by an integrated body control unit (IBU) of the processor 110.

The RF module 131 performs control over the locking or unlocking of the door of the vehicle 10 at a remote place, for example, 30 m or more away from the vehicle 10, and processes a vehicle startup function. Furthermore, the RF module 131 transmits a location information result value for a transmission output of the LF module 132 so that the processor 110 can identify the location of the smart key 20.

The LF module 132 registers information on the smart key 20 with the vehicle 10, controls the locking or unlocking of the door of the vehicle when the battery of the smart key 20 is discharged, processes the vehicle startup function, and identifies the location of the smart key 20 through consistent communication with the smart key 20. The LF module 132 may identify whether the smart key 20 is disposed within a predetermined distance from the vehicle 10.

The UWB module 133 identifies whether the smart key 20 registered with the vehicle 10 approaches the vehicle 10 within a predetermined distance in order to prevent the hacking of the vehicle 10.

In addition, the vehicle 10 further includes a Bluetooth (BLE) or NFC module, and may control the door of the vehicle 10 based on a signal that is received through the BLE or NFC module. The vehicle 10 may communicate with a mobile communication terminal (not illustrated) through BLE, or may control the locking of the door through fingerprint recognition or an NFC tag. The BLE, NFC, and UWB module 133 may be controlled by an integrated authorization control unit (IAU) of the processor 110.

Furthermore, the communication unit 130 includes a wired or wireless communication module, and may communicate with a vehicle, an external terminal, or a server.

For example, the communication unit 130 may perform communication through wireless access in vehicular environment (WAVE) for communication with a vehicle and a road facility and through vehicle to everything (V2X) for inter-vehicle communication. Furthermore, the communication unit 130 includes at least one of short-distance communication, mobile communication, and serial communication, such as Ethernet, Wi-Fi, Bluetooth (BLE), and near field communication (NFC).

The processor 110 may include at least one micro-processor.

The processor 110 may be any one of an electric control unit (ECU), a vehicle control unit (VCU), and a main control unit (MCU). Furthermore, the processor 110 may include the IBU and the IAU.

The processor 110 identifies the state of the vehicle 10, generates notification or a warning for the state, and outputs the notification or warning through the output unit 150.

The processor 110 identifies the location of the smart key 20 based on signals that are transmitted to and received from the smart key 20 through the communication unit 130, and controls the locking or unlocking of the door of the vehicle. Furthermore, the processor 110 may detect the approach of a user to the vehicle through the sensor 140, and may check the pressing of a key by a user by using a sensor signal and a signal of the smart key 20.

The processor 110 controls operations of the RF module 131, LF module 132, and UWB module 133 of the communication unit 130, controls the locking or unlocking of the door through an RF signal, and controls the vehicle startup function and the locking or unlocking of the door through an LF signal and an RF signal.

The processor 110 registers the smart key 20 based on data that are transmitted and received through the communication unit 130, performs certification on a signal of the smart key 20, and controls the locking of the door when a smart key is the registered smart key 20 based on the results of the certification.

The processor 110 identifies the location of the smart key 20 through the RF module 131 and LF module 132 of the communication unit 130, receives a signal according to a manipulation of a button of the smart key 20, controls the door based on a code that is included in the signal, and determines whether the signal is normal based on a count.

The processor 110 stores a count that is included in the received signal of the smart key 20 in the memory 120, and determines whether the count is normal by comparing the count and a pre-stored count.

The processor 110 unlocks the door based on the results of the certification of the smart key 20 when the smart key 20 is disposed within a first distance, and controls the door to be automatically locked when the smart key 20 becomes distant from the vehicle by the first distance or more.

The processor 110 may lock or unlock the door in response to the reception of a signal of the smart key 20 within the first distance or the reception of a signal of the smart key 20 within a second distance greater than the first distance.

The processor 110 may output a state of the door through the output unit 150, and may transmit related information to a registered terminal through the communication unit 130 according to circumstances.

The smart key 20 and the vehicle 10 perform wireless communication by using an LF signal of 125 kHz and an RF (UHF band) signal of 433.92 MHZ, respectively.

Figure 3:
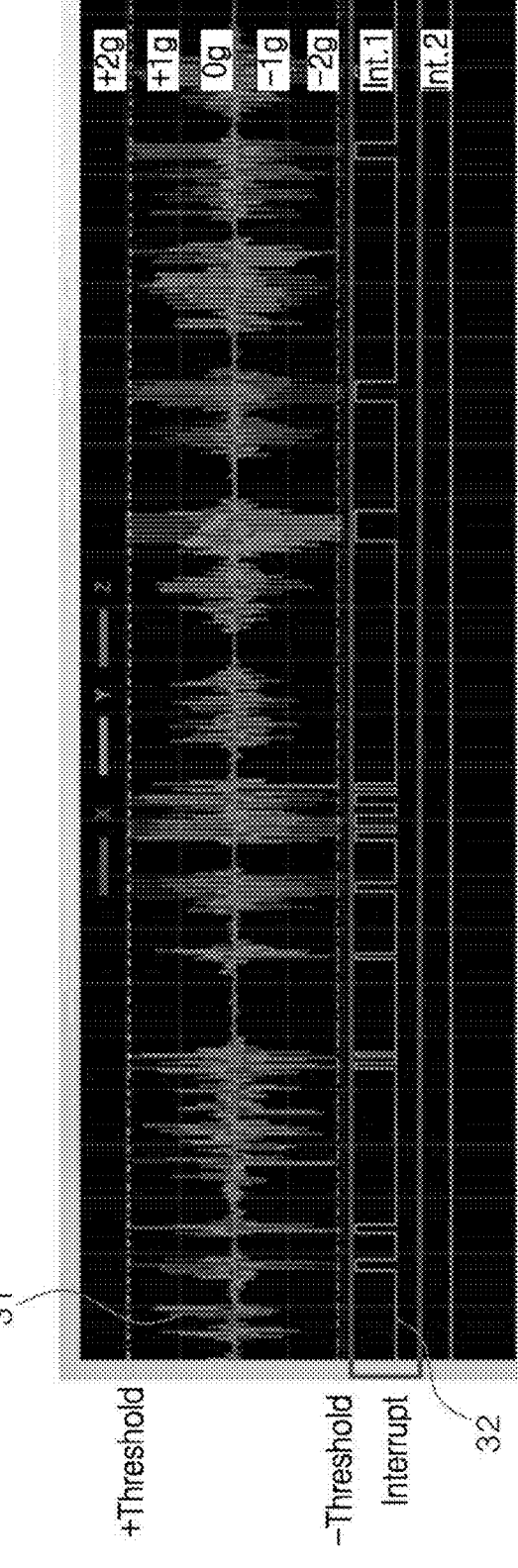
FIG. 3 is a diagram to which reference is made to describe an interrupt count using the vibration of the smart key of the smart key system according to an embodiment of the present disclosure.

FIG. 3 is a diagram to which reference is made to describe an interrupt count using the vibration of the smart key of the smart key system according to an embodiment of the present disclosure.

As illustrated in FIG. 3, the vibration sensor 21 of the smart key 20 generates a vibration signal 31 for a movement or displacement of the smart key 20, and applies the vibration signal 31 to the smart key processor 23.

The vibration sensor 21 generates an interrupt 32 when the vibration signal 31 that is detected is greater than a preset maximum reference value (i.e., + threshold) and a preset minimum reference value (i.e., − threshold). The vibration sensor 21 applies the interrupt 32 to the smart key processor 23.

The smart key processor 23 counts the number of interrupts occurred, and stores the count in memory (not illustrated).

The smart key processor 23 cumulatively stores the count up to a maximum value, and invokes the stored count when transmitting a signal to the vehicle 10 in response to the pressing of the button 24.

The smart key processor 23 generates a signal that has a designated format and that includes a code and a count, and then transmits the signal to the vehicle 10 through the communication module 22.

Figure 4A:
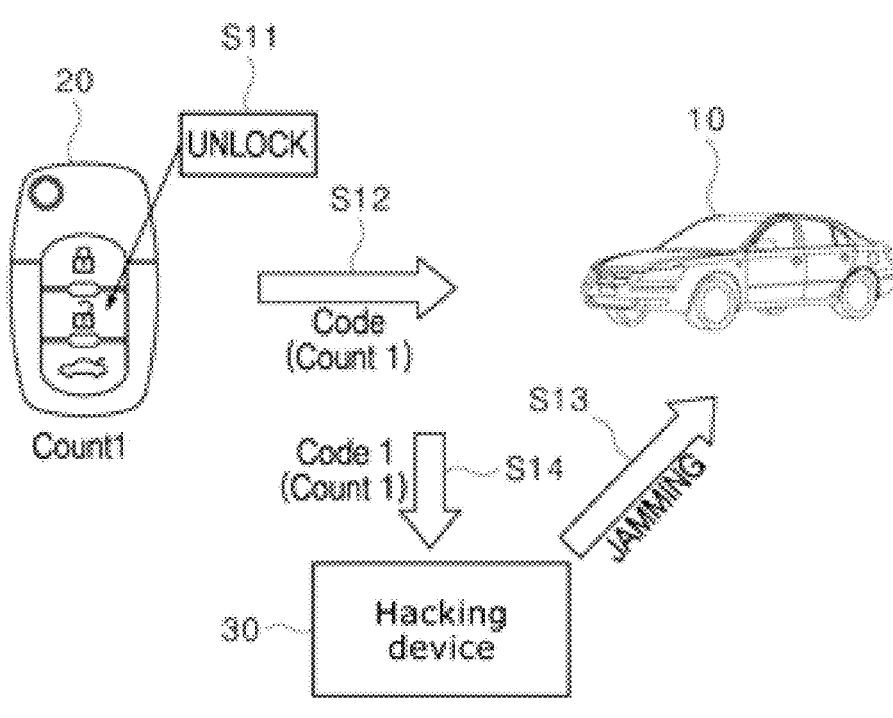
FIGS. 4A and 4B are diagrams to which reference is made to describe a process of intercepting, by a hacking device, a signal of the smart key of the smart key system according to an embodiment of the present disclosure.
Figure 4B:
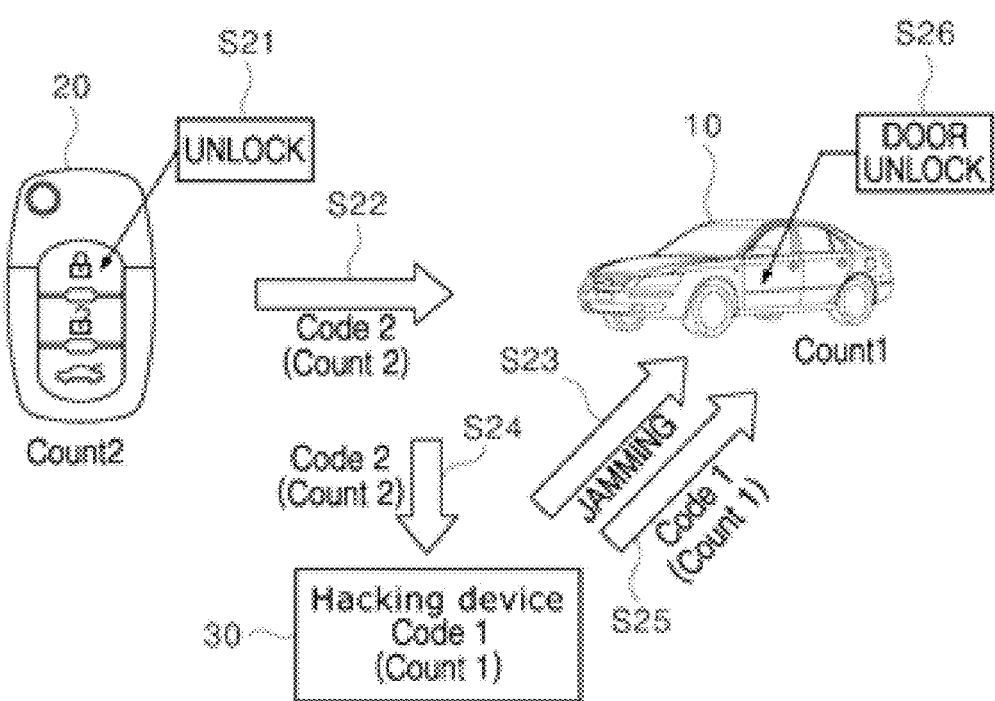

FIGS. 4A and 4B are diagrams to which reference is made to describe a process of intercepting, by a hacking device, a signal of the smart key of the smart key system according to an embodiment of the present disclosure.

As illustrated in FIG. 4A, when the smart key 20 is moved by a user or displaced, the vibration sensor 21 detects a vibration signal according to such a movement or displacement. The vibration sensor 21 generates an interrupt when the vibration signal is greater than a reference value, and applies the interrupt to the smart key processor 23.

The smart key processor 23 counts the number of interrupts and cumulatively stores the count.

When an opening key or unlocking key for the smart key 20 is pressed (S11), the smart key 20 generates a signal including a code relating to the lock, unlocking, trunk opening, or startup of the vehicle and a count COUNT 1 for an interrupt, and transmits the signal to the vehicle 10 (S12). A value that has been previously stored in the memory at timing at which the pressing of a key occurs may be used as the count.

At this time, a hacking device 30 may jam radio waves so that the signal of the smart key 20 is not transmitted to the vehicle 10 (S13). The hacking device 30 intercepts the signal transmitted by the smart key 20 (S14). The hacking device 30 stores the intercepted signal (CODE 1+COUNT 1).

The hacking device 30 may intercept the signal of the smart key 20 even without jamming. The hacking device 30 may attempt the unlocking of the vehicle 10 by using intercepted signal.

As illustrated in FIG. 4B, the user may press the button of the smart key 20 again (S21).

The smart key 20 transmits, to the vehicle 10, a signal including a count COUNT 2 and a code CODE 2 at timing at which the button is pressed (S22).

The hacking device 30 interrupts the signal of the smart key 20 so that the signal is not transmitted to the vehicle 10 through jamming (S23), and simultaneously intercepts the signal (CODE 2+COUNT 2) of the smart key 20 (S24).

Furthermore, the hacking device 30 transmits the previously stored signal (CODE 1+COUNT 1) to the vehicle 10 (S25). The hacking device 30 stores the newly intercepted signal (CODE 2+COUNT 12).

When receiving the signal (CODE 1+COUNT 1), the vehicle 10 checks the code and the count and unlocks a door of the vehicle 10 (S26).

As the smart key 20 is moved by the user, the count continues to be increased. Accordingly, the count COUNT 2 when the second signal is transmitted is greater than the count COUNT 1 when the first signal is transmitted.

The hacking device 30 intercepts and stores a signal for the locking of the door of the vehicle 10. At this time, the door of the vehicle 10 is unlocked, but the user can get on the vehicle because the user is placed at an adjacent location.

Figure 5A:
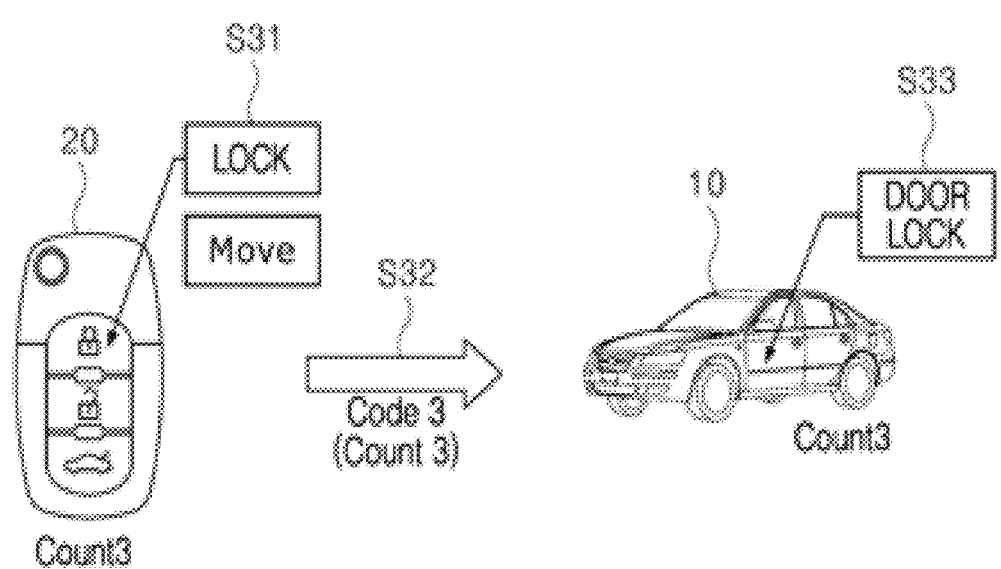
FIGS. 5A and 5B are diagrams to which reference is made to describe a method of identifying, by the smart key system, a signal of the hacking device according to an embodiment of the present disclosure.
Figure 5B:
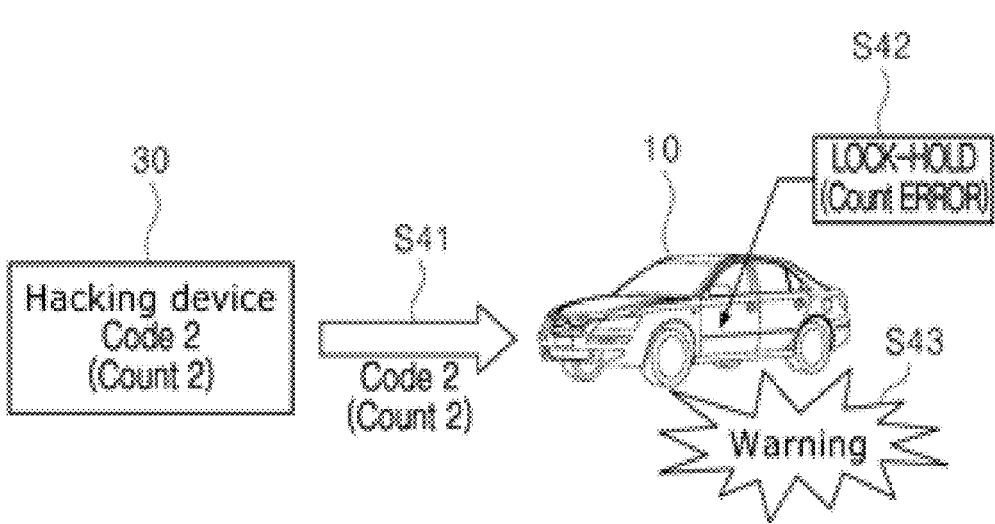

FIGS. 5A and 5B are diagrams to which reference is made to describe a method of identifying, by the smart key system, a signal of the hacking device according to an embodiment of the present disclosure.

As illustrated in FIG. 5A, after the vehicle 10 stops, a user gets off the vehicle 10.

The location of the smart key 20 is changed as the user moves. When the user presses a lock key (S31), the smart key 20 transmits, to the vehicle 10, a signal for the lock including a count COUNT 3 (S32). The vehicle 10 stores the count COUNT 3.

The processor 110 compares a pre-stored count COUNT 1 and the newly received count COUNT 3, and determines that the newly received count COUNT 3 is normal when the newly received count COUNT 3 is greater than the pre-stored count COUNT 1.

Accordingly, the vehicle 10 sets the locking of a door of the vehicle 10 (S33).

The user moves with the smart key 20, and the count continues to increase.

If the smart key 20 becomes distant from the vehicle by a first distance or more, the vehicle 10 may automatically lock the door even without a separate signal. According to circumstances, the vehicle 10 may receive and store a count in last communication with the smart key 20.

As illustrated in FIG. 5B, the hacking device 30 may attempt the unlocking of the vehicle 10 by using an intercepted signal.

The hacking device 30 transmits, to the vehicle 10, the signal (CODE 2+COUNT 2) that has been finally stored (S41).

The vehicle 10 certifies whether a received signal is a normal signal. At this time, the vehicle 10 determines that the received signal is a signal of the smart key 20 registered with the vehicle 10 and completes the certification, because the received signal is a signal including information of the smart key 20.

The processor 110 compares the pre-stored count COUNT 3 and the new count COUNT 2. The processor 110 outputs an error because the pre-stored count COUNT 3 is smaller than the new count COUNT 2.

In some cases, in the case of an automatic lock according to a movement of the smart key 20, the processor 110 may compare a count COUNT 4 that has been finally stored and the new count COUNT 2.

The processor 110 checks whether a count has been initialized because the count has reached a maximum value, and outputs an error.

For example, if the pre-stored count is 9999 and the new count is 0010, the processor 110 determines that the new count is normal by determining that the new count corresponds to a phenomenon attributable to count initialization.

If a count corresponds to a signal adjacent to a maximum value and a subsequently checked count is close to 0, the processor 110 may treat such a count as an exception because the count corresponds to a phenomenon attributable to count initialization.

If the pre-stored count is 3217 and the new count is 2987, the processor 110 determines the new count as a count error.

When a difference between counts is equal to or greater than a predetermined value, the processor 110 may determine that a corresponding count is normal. The processor 110 may change and apply the size of the predetermined value over time that has elapsed from timing at which the corresponding count has been stored.

In contrast, when the difference between the counts is smaller than the predetermined value in the state in which the smart key 20 has approached the vehicle, the processor 110 may determine that a corresponding count is normal by treating the count as an exception or may not compare the counts. The processor 110 may not compare the counts based on the location of the smart key 20, which is determined through communication with the smart key 20, and the location of a user, which is detected through the sensor 140, and may process a signal of the smart key 20.

When the new count is smaller than the pre-stored count, the processor 110 may determine the new count as an intercepted signal by hacking. The processor 110 treats, as an exception, a case in which the new count has been initialized and a case in which the smart key 20 is disposed close to the vehicle.

The processor 110 locks the door and holds the locking for a predetermined time (S42).

Furthermore, the processor 110 generates a warning for the hacking and outputs the warning through the output unit 150 (S43).

Figure 6:
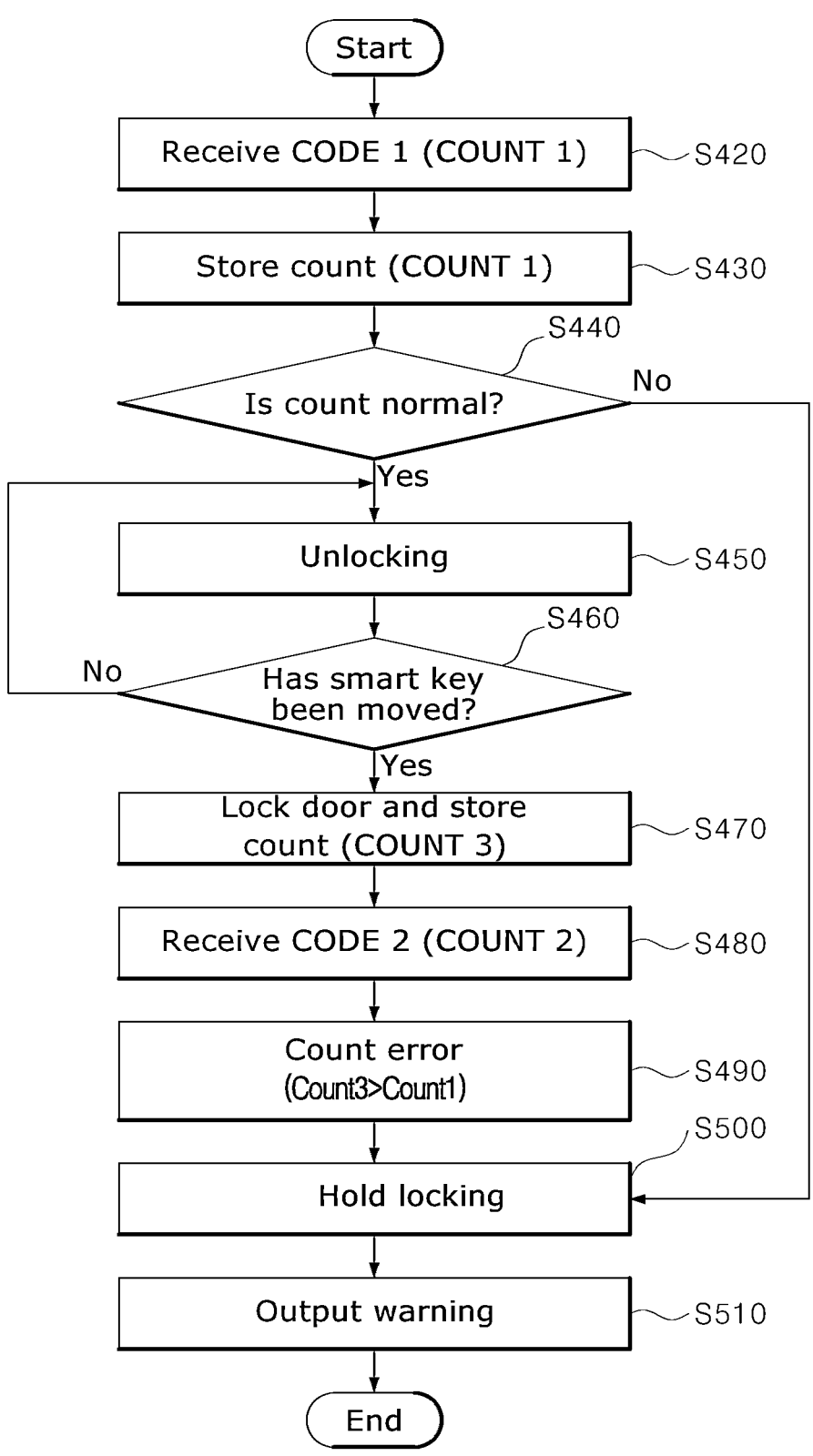
FIG. 6 is a flowchart illustrating a method of controlling, by a vehicle, the smart key system according to an embodiment of the present disclosure.

FIG. 6 is a flowchart illustrating a method of controlling, by the vehicle, the smart key system according to an embodiment of the present disclosure.

As illustrated in FIG. 6, the processor 110 of the vehicle 10 identifies the location of the smart key 20 through communication with the smart key 20, and receives a signal of the smart key 20 (S410). The signal received from the smart key 20 includes a code and a count (CODE 1+COUNT 1) according to the pressing of the button.

The processor 110 stores the count COUNT 1 in the memory 120 (S420).

The processor 110 compares the pre-stored count and a received count, and determines whether the received count is normal based on a difference between the pre-stored count and the received count (S430).

When the received count is greater than the pre-stored count, the processor 110 determines that the received count is normal. Furthermore, if the smart key 20 registered with the vehicle 10 is disposed at a location adjacent to the vehicle 10, the processor 110 treats the received count as an exception without determining whether the received count is normal.

The processor 110 unlocks a door of the vehicle because the received count is normal (S440).

When the received count is smaller than the pre-stored count, the processor 110 determines the received count as a count error, maintains the locking of the door, and holds locking of the door for a predetermined time so that the door is not unlocked (S490).

If the processor 110 has unlocked the door because the received count is determined to be normal, the processor 110 determines whether the smart key 20 has been moved through communication with the smart key 20 (S450).

If the smart key 20 has not been moved or has been disposed within a predetermined distance from the vehicle 10, the processor 110 maintains the unlocking state (S440).

When the smart key 20 moves, the processor 110 checks the location of the smart key 20. When the location of the smart key 20 becomes distant from the vehicle 10 by a first distance or more or when a signal for the locking of the door is received from the smart key 20, the processor 110 changes the state of the door into the lock state and stores, in the memory, a count COUNT 3 included in the signal or a count that has been received upon last communication (S460).

The processor 110 receives a new signal from the smart key 20 in the state in which the door has been locked (S470). The processor 110 stores a new count COUNT 2 included in the new signal.

The processor 110 compares the pre-stored count COUNT 3 and the new count COUNT 2, and determines the new count as a count error when the new count is smaller than the pre-stored count (S480).

Furthermore, when a difference between the pre-stored count and the new count is smaller than a predetermined value although the new count is greater than the pre-stored count, the processor 110 may determine the new count as an error. In this case, the processor 110 treats, as an exception, a case in which the new count has been initialized because the new count has reached a maximum value or a case in which the smart key 20 has been disposed close to the vehicle within a predetermined distance.

The processor 110 maintains the state of the door to the lock state with respect to the count error, and holds the lock state for a predetermined time or more so that the lock of the door is maintained (S490).

The processor 110 generates a warning by determining the new count as a count error attributable to hacking, and outputs the warning through the output unit 150 (S500). The output unit 150 outputs the warning in the form of at least one of a warning message, a warning sound, and voice guidance.

Furthermore, the processor 110 may transmit the warning message to a user terminal that has been previously registered with the vehicle through the communication unit 130.

Accordingly, the smart key system for a vehicle and the method of controlling the same according to aspects of the present disclosure can solve a signal interception problem attributable to hacking and prevent the robbery of a vehicle or an article within the vehicle, by divisively identifying the interception of a signal of the smart key attributable to hacking and holding the lock state of a door of the vehicle so that the door maintains the lock state for a predetermined time.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A smart key system for a vehicle, comprising:
   a communication unit configured to communicate with a smart key;
   a memory configured to store a code and a count that are included in a signal received from the smart key; and
   a processor configured to identify whether the smart key has been registered with the vehicle based on the signal, determine whether the count is normal by comparing the count with a pre-stored count, in response to a determination that the count is normal when the count is greater than the pre-stored count by a predetermined value or more, the processor configured to control a door of the vehicle in response to the code, and in response to a determination that the count is not normal, the processor configured to control the door to maintain a lock state,
   wherein in response to the door of the vehicle is controlled in response to the code, the processor is configured to determine whether a location of the smart key becomes a distance from the vehicle by a first distance or more,
   in response to a determination that the location of the smart key becomes the distance from the vehicle by the first distance or more, the processor is configured to control the door of the vehicle and update the pre-stored count.

2. The smart key system of claim 1, wherein the processor is configured to:
   determine that the count is not normal when the count is equal to or less than the pre-stored count.

3. The smart key system of claim 1, wherein the processor is configured to identify a location of the smart key based on the signal of the smart key,
   in response to the location of the smart key is within a predetermined distance from the vehicle, the processor does not compare the count and the pre-stored count by treating, as an exception, and controls the door based on the count.

4. The smart key system of claim 1, further comprising:
   an output unit configured to output a warning in a form of at least one of a warning message, a warning lamp, a warning sound, and voice guidance when the count is not normal.

5. A method of controlling, by a vehicle, a smart key system, the method comprising:
   receiving, by a communication unit, a signal from a smart key;
   identifying, by a processor, whether the smart key has been registered with the vehicle and identifying a code and a count included in the signal;
   determining, by the processor, whether the count is normal by comparing the count with a pre-stored count;
   in response to a determination that the count is normal when the count is greater than the pre-stored count by a predetermined value or more, controlling, by the processor, a door of the vehicle in response to the code; and
   in response to a determination that the count is not normal, controlling, by the processor, the door to maintain a lock state,
   the method further comprising:
   in response to the door of the vehicle is controlled in response to the code, determining whether a location of the smart key becomes a distance from the vehicle by a first distance or more; and
   in response to a determination that the location of the smart key becomes the distance from the vehicle by the first distance or more, controlling the door of the vehicle and updating the prestored count.

6. The method of claim 5, wherein the determining, by the processor, whether the count is normal by comparing the count with a pre-stored count comprising: in response to the location of the smart key is within a predetermined distance from the vehicle, controlling the door in response to the code by treating, as an exception.

7. The method of claim 5, further comprising:

outputting, by an output unit, a warning in a form of at least one of a warning message, a warning lamp, a warning sound, and voice guidance when the count is not normal.

8. The method of claim 5, wherein the count is a number of interrupts occurred cumulatively, which are generated by a vibration sensor included in the smart key.

\*   \*   \*   \*   \*